United States Patent [19]

Young

[11] 4,356,338

[45] Oct. 26, 1982

[54] EXTENDING CATALYST LIFE BY TREATING WITH PHOSPHORUS AND/OR STEAM

[75] Inventor: Lewis B. Young, Skillman, N.J.

[73] Assignee: Mobil Oil Corporation, New York, N.Y.

[21] Appl. No.: 195,032

[22] Filed: Oct. 8, 1980

Related U.S. Application Data

[62] Division of Ser. No. 61,223, Jul. 27, 1979, abandoned.

[51] Int. Cl.$^3$ .................. C10G 11/05; C10G 49/08; C10G 63/04
[52] U.S. Cl. .................. 585/407; 208/114; 208/135; 585/466; 585/475; 585/481
[58] Field of Search ............ 585/400, 407, 481, 486, 585/466, 470, 475, 483, 486, 477, 476, 410; 208/135, 114

[56] References Cited

U.S. PATENT DOCUMENTS

| | | | |
|---|---|---|---|
| 3,551,353 | 12/1970 | Chen et al. | 252/455 Z |
| 4,002,698 | 1/1977 | Kaeding | 252/411 R |
| 4,011,276 | 3/1977 | Chu | 585/471 |
| 4,044,065 | 8/1977 | Butter et al. | 208/135 X |
| 4,097,367 | 6/1978 | Haag et al. | 208/135 X |
| 4,098,837 | 7/1978 | Chu | 585/471 |
| 4,128,592 | 12/1978 | Kaeding | 252/435 X |
| 4,227,992 | 10/1980 | Garwood et al. | 208/135 X |

*Primary Examiner*—Delbert E. Gantz
*Assistant Examiner*—G. E. Schmitkons
*Attorney, Agent, or Firm*—C. A. Huggett; R. J. Cier; G. W. Allen

[57] ABSTRACT

There is disclosed a method for decreasing catalyst coking and extending the usable catalyst life by pretreatment of the catalyst with steam and/or a phosphorus-containing compound. Catalysts benefiting from such pre-treatment comprise crystalline zeolites characterized by a silica to alumina mole ratio of at least 12 and a constraint index, as herein defined, within the approximate range of 1 to 12.

8 Claims, 3 Drawing Figures

ETHYLBENZENE COKING AT 525°C

EXTENDING CATALYST LIFE BY TREATING WITH PHOSPHORUS AND/OR STEAM

CROSS-REFERENCE TO RELATED APPLICATION

This application is divisional of the abandoned application of Lewis B. Young having Ser. No. 061,223 filed July 27, 1979, now abandoned.

BACKGROUND OF THE INVENTION

1. Field of the Invention

This invention is concerned with extending the useful life of zeolite catalysts by reducing coke formation and aging rate.

2. Description of the Prior Art

Crystalline zeolite catalysts are widely utilized in many important and industrially significant processes. They are used in the petroleum industry in the refining of crude oil into lighter fractions, catalyzing such reactions as cracking relatively large or undesirably branched molecules into more useful smaller molecules, reforming or restructuring molecules into other molecular structures having other more desirable utility, and in aromatization reactions (i.e. the conversion of paraffins and olefins to aromatic compounds), to name just a few. The chemical industry also utilizes these rather amazing catalysts in similar types of reactions to produce materials which had previously been relatively difficult or even impossible to manufacture by conventional non-zeolite technology.

One of the limitations of zeolite catalysts has been its tendency to "age" or lose its high level of activity with time. This has been attributed to the formation of undesirable carbonaceous deposits or "coke" on the catalyst's active sites during hydrocarbon conversion reactions. The problem seems to be exacerbated when the zeolite catalyst is carried on a binder material which itself may contribute to the cracking reaction to produce more coke. Aluminum oxide, which is a very commonly used binder for zeolite catalysts, is a particularly noteworthy offender in this respect. Once the carbon deposits have reached the point where the reaction level becomes economically undesirable, the only known way to correct the problem has been to shut down the reactor and burn the carbon off of the catalyst in an oxygen-containing atmosphere. This, needless to say, is an expensive operation which one would rather not have to resort to any more frequently than absolutely necessary.

SUMMARY OF THE INVENTION

It has been discovered that the pretreatment of zeolite catalysts, and particularly of zeolite catalysts carried on binder matrices which have a tendency to increase the formation of coke, with phosphorus and/or steam has an unexpected retarding effect with respect to coke formation on the catalyst and/or the binder. Large and unexpected reductions in coke formation and aging rate occur with only mild pretreatment of the catalyst, resulting in very desirable extensions of the useful life of the catalyst between regeneration cycles.

Pretreatment may be accomplished by the impregnation of the catalyst or of the catalyst/binder combination with a phosphorus containing compound to deposit approximately 4 wt.% of phosphorus thereon, and preferably from about 2% to about 15% by weight of phosphorus, based on the weight of the catalyst or catalyst/binder matrix being treated.

Pretreatment may also be accomplished by steaming the catalyst before use. Steaming is preferably accomplished by contacting the catalyst with an atmosphere containing from about 5% to about 100% steam, at a temperature of from about 250° C. to about 1000° C., for a period of time ranging between 15 minutes and 100 hours. It has been found to be particularly desirable to pretreat the zeolite or zeolite/binder matrix with a combination of steaming and phosphorus impregnation, thereby deriving benefit from both.

BRIEF DESCRIPTION OF THE DRAWINGS

The improved catalyst performance resulting from utilization of this invention will be illustrated with the aid of the appended drawings in which.

DESCRIPTION OF SPECIFIC EMBODIMENTS

Figure 1:
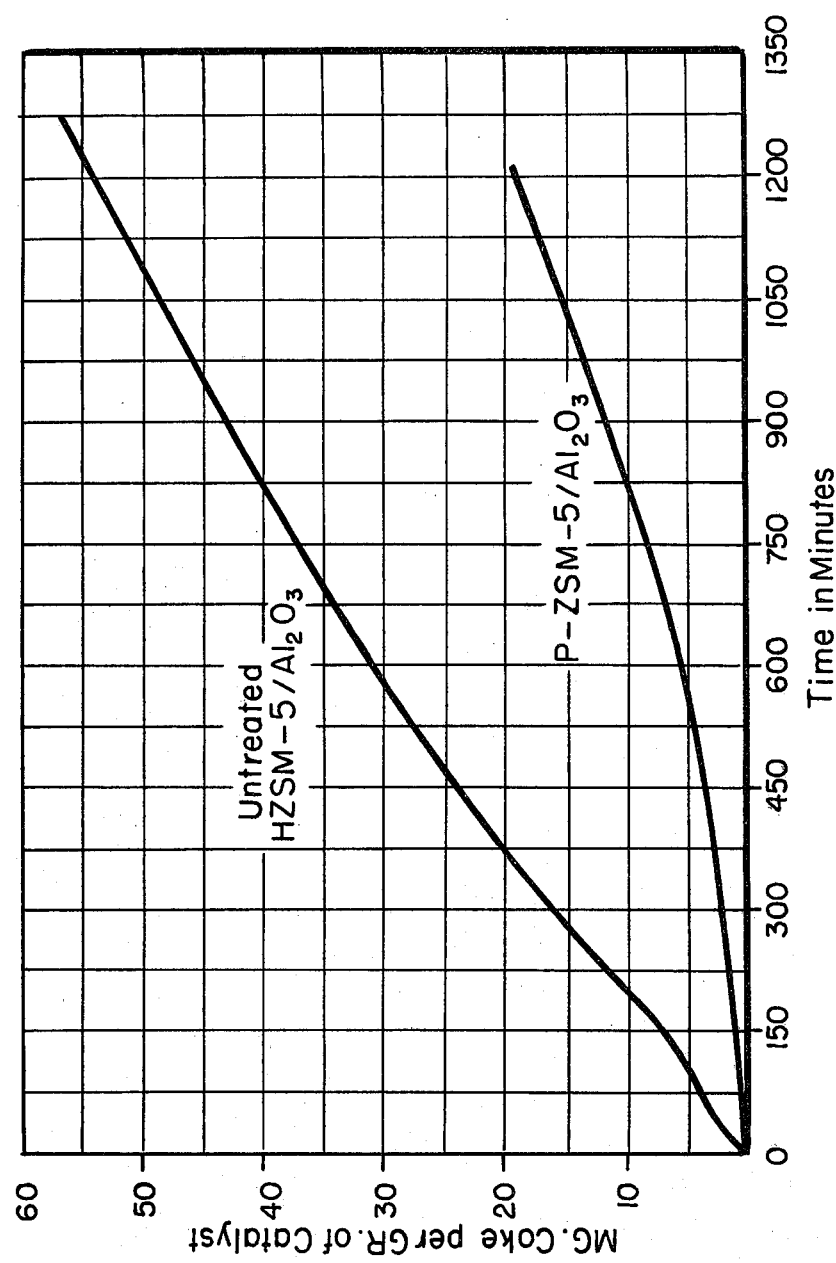
FIG. 1 is a graphical illustration of the effect of phosphorus pretreatment on the catalyst coking rate utilizing 1,2-dimethylbenzene at 500° C. (Example 4)

The crystalline zeolites utilized herein are members of a novel class of zeolitic materials which exhibit unusual properties. Although these zeolites have unusually low alumina contents, i.e. high silica to alumina mole ratios, they are very active even when the silica to alumina mole ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning carbonaceous deposits with oxygen-containing gas such as air.

An important characteristic of the crystal structure of this novel class of zeolites is that it provides a selective constrained access to and egress from the intracrystalline free space by virtue of having an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina ratio of at least 12 are useful, it is preferred in some applications to use zeolites having higher silica/alumina ratios of at least about 30. In addition, zeolites as otherwise characterized herein but which are substantially free of aluminum, i.e. having silica to alumina mole ratios of 1,600 and higher, are found to be useful and even preferable in some instances. Such "high silica" zeolites are intended to be included within this description. The novel class of zeolites, after activation, acquire an intracrystalline sorption capacity for normal hexane which is greater than that for water, i.e. they exhibit "hydrophobic" properties. This hydrophobic character can be used to advantage in some applications.

The novel class of zeolites useful herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons and, therefore, it is not the present intention to entirely judge the usefulness of a particular zeolite solely from theoretical structural considerations.

Rather than attempt to judge from crystal structure whether or not a zeolite possesses the necessary constrained access to molecules of larger cross-section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10 to 60% for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. and a liquid hourly space velocity of less than one, such as 0.1 or less, can be employed in order to achieve a minimum total conversion of about 10%.

The "Constraint Index" is calculated as follows:

$$\text{Constraint Index} = \frac{\log_{10} (\text{fraction of hexane remaining})}{\log_{10} (\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (CI) values for some typical materials are:

|  | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Clinoptilolite | 3.4 |
| Beta | 0.6 |
| H-Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables such as crystal size of the zeolite, the presence of occluded contaminants, etc., may affect the constraint index. Therefore, it will be appreciated that it may be possible to so select test conditions as to establish more than one value in the range of 1 to 12 for the Constraint Index of a particular zeolite. Such a zeolite exhibits the constrained access as herein defined and is to be regarded as having a Constraint Index in the range of 1 to 12. Also contemplated herein as having a Constraint Index in the range of 1 to 12 and therefore within the scope of the defined novel class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value within the range of 1 to 12. Thus, it should be understood that the Constraint Index value as used herein is an inclusive rather than an exclusive value. That is, a crystalline zeolite when identified by any combination of conditions within the testing definition set forth herein as having a Constraint Index in the range of 1 to 12 is intended to be included in the instant novel zeolite definition whether or not the same identical zeolite, when tested under other of the defined conditions, may give a Constraint Index value outside of the range of 1 to 12.

The novel class of zeolites defined herein is exemplified by ZSM-5, ZSM-11, ZSM-12, ZSM-23, ZSM-35, ZSM-38, and other similar materials.

ZSM-5 is described in greater detail in U.S. Pat. Nos. 3,702,886 and 3,941,871. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed catalyst, is incorporated herein by reference.

ZSM-35 is described in U.S. Pat. No. 4,016,245. The description of that catalyst, and particularly the X-ray diffraction pattern thereof, is incorporated herein by reference.

ZSM-38 is more particularly described in U.S. Pat. No. 4,046,859. The description of that catalyst, and particularly the specified X-ray diffraction pattern thereof, is incorporated herein by reference.

It is to be understood that by incorporating by reference the foregoing patents to describe examples of specific members of the novel class with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation of the identified patents should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described, when prepared in the presence of organic cations, are substantially catalytically inactive, possibly because the intracrystalline free space is occupied by organic cations from the forming solution. They may be activated by heating in an inert atmosphere at 540° C. for one hour, for example, followed by base exchange with ammonium salts followed by calcination at 540° C. in air. The presence of organic cations in the forming solution may not be absolutely essential to the formation of this type zeolite; however, the presence of these cations does appear to favor the formation of this special class of zeolite. More generally, it is desirable to activate this type catalyst by base exchange with ammonium salts followed by calcination in air at about 540° C. for from about 15 minutes to about 24 hours.

Natural zeolites may sometimes be converted to zeolite structures of the class herein identified by various activation procedures and other treatments such as base exchange, steaming, alumina extraction and calcination, alone or in combinations. Natural minerals which may be so treated include ferrierite, brewsterite, stilbite, dachiardite, epistilbite, heulandite, and clinoptilolite.

The preferred crystalline zeolites for utilization herein include ZSM-5, ZSM-11, ZSM-12, ZSM-23, ZSM-35 and ZSM-38, with ZSM-5 being particularly preferred.

In a preferred aspect of this invention, the zeolites hereof are selected as those providing among other things a crystal framework density, in the dry hydrogen form, of not less than about 1.6 grams per cubic centimeter. It has been found that zeolites which satisfy all three of the discussed criteria are most desired for several reasons. When hydrocarbon products or by-products are catalytically formed, for example, such zeolites tend to maximize the production of gasoline boiling range hydrocarbon products. Therefore, the preferred zeolites useful with respect to this invention are those having a Constraint Index as defined above of about 1 to about 12, a silica to alumina mole ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article ZEOLITE STRUCTURE by W. M. Meier. This paper, the entire contents of which are incorporated herein by reference, is included in PROCEEDINGS OF THE CONFERENCE OF MOLECULAR SIEVES, (London, April 1967) published by the Society of Chemical Industry, London, 1968.

When the crystal structure is unknown, the crystal framework density may be determined by classical pyknometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

It is possible that the unusual sustained activity and stability of this special class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites, including some which are not within the purview of this invention, are:

|  | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |

| | Void Volume | Framework Density |
|---|---|---|
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable metal cations of Groups I through VIII of the Periodic Table, including, by way of example, nickel, copper, zinc, palladium, calcium or rare earth metals.

In practicing a particularly desired chemical conversion process, it may be useful to incorporate the above-described crystalline zeolite with a matrix comprising another material resistant to the temperature and other conditions employed in the process. Such matrix material is useful as a binder and imparts greater resistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

The crystalline zeolites utilizable herein are modified prior to use by pretreating them with steam and/or a phosphorus containing compound. Treatment with phosphorus containing compounds can readily be accomplished by contacting the catalyst with a solution of an appropriate phosphorus compound, followed by drying and calcining to convert the phosphorus to its oxide form.

Representative phosphorus-containing compounds which may be used include derivatives of groups represented by $PX_3$, $RPX_2$, $R_2PX$, $R_3P$, $X_3PO$, $(XO)_3PO$, $(XO)_3P$, $R_3P=O$, $R_3P=S$, $RPO_2$, $RPS_2$, $RP(O)(OX)_2$, $RP(S)(SX)_2$, $R_2P(O)OX$, $R_2P(S)SX$, $RP(OX)_2$, $RP(SX)_2$, $ROP(OX)_2$, $RSP(SX)_2$, $(RS)_2PSP(SR)_2$, and $(RO)_2POP(OR)_2$, where R is an alkyl or aryl, such as a phenyl radical, and X is hydrogen, R, or halide. These compounds include primary, $RPH_2$, secondary, $R_2PH$ and tertiary, $R_3P$, phosphines such as butyl phosphine, the tertiary phosphine oxides $R_3PO$, such as tributylphosphine oxide, the tertiary phosphine sulfides, $R_3PS$, the primary, $RP(O)(OX)_2$, and secondary, $R_2P(O)OX$, phosphonic acids such as benzene phosphonic acid, the corresponding sulfur derivatives such as $RP(S)(SX)_2$ and $R_2P(S)SX$, the esters of the phosphonic acids such as dialkyl phosphonate, $(RO)_2P(O)H$, dialkyl alkyl phosphonates, $(RO)_2P(O)R$, and alkyl dialkylphosphinates, $(RO)P(O)R_2$; phosphinous acids, $R_2POX$, such as diethylphosphinous acid, primary, $(RO)P(OX)_2$, secondary, $(RO)_2POX$, and tertiary, $(RO)_3P$, phosphites, and esters thereof such as the monopropyl ester, alkyl dialkylphosphinites, $(RO)PR_2$, and dialkyl alkylphosphinite, $(RO)_2PR$, esters. Corresponding sulfur derivates may also be employed including $(RS)_2P(S)H$, $(RS)_2P(S)R$, $(RS)P(S)R_2$, $R_2PSX$, $(RS)P(SX)_2$, $(RS)_2PSX$, $(RS)_3P$, $(RS)PR_2$ and $(RS)_2PR$. Examples of phosphite esters include trimethylphosphite, triethylphosphite, diisopropylphosphite, butylphosphite, and pyrophosphites such as tetraethylpyrophosphite. The alkyl groups in the mentioned compounds preferably contain one to four carbon atoms.

Other suitable phosphorus-containing compounds include ammonium hydrogen phosphate, the phosphorus halides such as phosphorus trichloride, bromide, and iodide, alkyl phosphorodichloridites, $(RO)PCl_2$, dialkyl phosphorochloridites, $(RO)_2PCl$, dialkylphosphinochloroidites, $R_2PCl$, alkyl alkylphosphonochloridates, $(RO)(R)P(O)Cl$, dialkyl phosphinochloridates, $R_2P(O)Cl$ and $RP(O)Cl_2$. Applicable corresponding sulfur derivates include $(RS)PCl_2$, $(RS)_2PCl$, $(RS)(R)P(S)Cl$ and $R_2P(S)Cl$.

Preferred phosphorus-containing compounds include ammonium dihydrogen phosphate, diammonium hydrogen phosphate, diphenyl phosphine chloride, trimethylphosphite, phosphorus trichloride, phosphoric acid, phenyl phosphine oxychloride, trimethylphosphate, diphenyl phosphinous acid, diphenyl phosphinic acid, diethylchlorothiophosphate, methyl acid phosphate and other alcohol-$P_2O_5$ reaction products.

Reaction of the catalyst with the phosphorus compound is effected by contacting the catalyst with such compound. Where the treating phosphorus compound is a liquid, such compound can be in solution at the time contact with the catalyst is effected. Any solvent relatively inert with respect to the treating compound and the zeolite may be employed. Suitable solvents include water and aliphatic, aromatic or alcoholic liquids. Where the phosphorus-containing compound is, for example, trimethylphosphite or liquid phosphorus trichloride, a hydrocarbon solvent such as octane may be employed. The phosphorus-containing compound may be used without a solvent, i.e. as a neat liquid. Where the phosphorus-containing compound is in the gaseous phase, such as where gaseous phosphorus trichloride is employed, the treating compound can be used by itself or can be used in admixture with a gaseous diluent relatively inert to the phosphorus-containing compound and the zeolite, such as air or nitrogen, or with an organic solvent, such as octane or toluene.

Prior to reacting the catalyst with the phosphorus-containing compound, the catalyst may be dried. Drying can be effected in the presence of air. Elevated temperatures may be employed. However, the temperature should not be such that the crystal structure of the zeolite is destroyed.

Heating of the phosphorus-containing catalyst subsequent to preparation and prior to use is also preferred. The heating can be carried out in the presence of oxygen—for example, in air. Heating can be at a temperature of about 150° C. However, higher temperatures, e.g. up to about 500° C., are preferred. Heating is generally carried out for 3–5 hours but may be extended to 24 hours or longer. While heating temperatures above about 500° C. can be employed, they are generally not necessary. At temperatures of about 1000° C. the crystal structure of the zeolite tends to deteriorate.

The amount of phosphorus incorporated with the catalyst should be at least about 1 percent by weight. However, it is preferred that the amount of phosphorus in the catalyst be at least about 2 percent by weight when the same is combined with a binder, e.g. 35 weight percent of aluminum oxide. The amount of phosphorus can be as high as about 25 percent by weight or more depending on the amount and type of binder present. Preferably, the amount of phosphorus added to the catalyst is between about 2 and about 15 percent by weight.

The amount of phosphorus incorporated with the catalyst by reaction with elemental phosphorus or phosphorus-containing compound will depend upon several factors. One of these is the reaction time, i.e. the time that the catalyst and the phosphorus-containing source are maintained in contact with each other. With greater reaction times, all other factors being equal, a greater amount of phosphorus is incorporated with the zeolite and/or the binder. Generally, contact time will be between about 15 minutes and about 20 hours. Other factors upon which the amount of phosphorus incorporated with the catalyst is dependent include reaction temperature, concentration of the treating compound in the reaction mixture, the degree to which the catalyst has been dried prior to reaction with the phosphorus-containing compound, the conditions of drying of the catalyst after reaction with the treating compound, and the amount and type of binder incorporated with the catalyst. Reaction temperature will generally be between about 25° C. and about 125° C. The concentration of the phosphorus in the reaction mixture is usually between about 1 and about 30 weight percent.

Steaming of the catalyst may be accomplished by contacting the zeolite, or zeolite-plus-binder combination, with an atmosphere containing from about 5 to about 100 percent of steam at a temperature of from about 250° C. to about 1000° C. for a period of from about 15 minutes to about 100 hours. Pressure may range from sub-atmospheric to several hundred atmospheres.

Particularly preferred embodiments contemplate a combination of steaming and phosphorus impregnation to achieve optimum benefit. When such combinations of treatments are employed, they may be carried out in either order—i.e. phosphorus impregnation followed by steaming or steaming followed by treatment with a phosphorus containing compound. It is, however, usually found to be convenient to carry out the steaming operation first.

Subsequent to the foregoing treatment of the catalyst to decrease the coking and aging rates, various activity-modifying components may be incorporated into the zeolite crystal to alter or enhance its selectivity for particular conditions. For instance, elements such as magnesium, phosphorus, boron, antimony, zinc, palladium, and so forth have been incorporated into zeolite catalysts, both individually and in various combinations, to improve para-selectivity, toluene disproportionation and other specific characteristics of the preferred zeolite catalyst. Such activity enhancing elements and treatments may be employed in conjunction with the pretreated catalysts of this invention in much the same manner and with the same beneficial effect as with the unpretreated catalysts of the prior art.

The invention, and the unexpected benefit to be derived therefrom, will be further illustrated with the aid of the following examples.

EXAMPLE 1

(P-ZSM-5/$Al_2O_3$)

A phosphorus treated catalyst was prepared by impregnation of an $NH_4$-ZSM-5 crystalline zeolite on $Al_2O_3$ (65% ZSM-5, 35% $Al_2O_3$) with aqueous diammonium hydrogen phosphate. The catalyst was soaked in a solution of 25 g of $(NH_4)_2HPO_4$ in 100 cc of $H_2O$ for 8 hours at 57° C. After soaking, the liquid was decanted and the catalyst was dried by suction. The catalyst was thereafter calcined in air by heating from 25° C. to 538° C. at 2° C./minute and then maintained at 538° C. for 10 hours. The P-ZSM-5/$Al_2O_3$ catalyst was analyzed for phosphorus and found to contain 3.2% P by weight.

EXAMPLE 2

(Stm-ZSM-5/$Al_2O_3$)

A steam treated catalyst was prepared by steaming an $NH_4$-ZSM-5/$Al_2O_3$ catalyst (65% ZSM-5, 35% $Al_2O_3$) with 100% steam at 399° C. and 1 atmosphere pressure for 48 hours. After steaming the catalyst was calcined in the same manner as Example 1.

EXAMPLE 3

(P.Stem-ZSM-5/$Al_2O_3$)

A sample of the Stm-ZSM-5/$Al_2O_3$ catalyst of Example 2 was soaked in a solution of 25 g $(NH_4)_2HPO_4$ in 100 cc of $H_2O$ for 7.6 hours at 60° C. After soaking, the liquid was decanted, the catalyst air dried by suction and then calcined as in Example 1. Analysis revealed a phosphorus content of 4.3 wt.% on the catalyst.

EXAMPLE 4

An experiment to illustrate the effect of the phosphorus treatment on coking rate was carried as follows using the P-ZSM-5/$Al_2O_3$ catalyst of Example 1 and, for purposes of comparison, a sample of the same catalyst without the phosphorus treatment.

About 50 mg of catalyst was placed in the sample basket of a thermogravimetric analyzer (TGA) and heated to 500° C. under a stream of nitrogen. After sample equilibration, a portion of the nitrogen stream was passed through a gas wash bottle containing 1,2-dimethylbenzene and then over the catalyst. The coke formation, defined as the increase in catalyst weight, was monitored as a function of time.

The results are shown in FIG. 1. As will be seen, the rate of coking for the P-ZSM-5/Al$_2$O$_3$ catalyst was only a fraction of the coking rate of the untreated catalyst.

EXAMPLE 5

Figure 2:
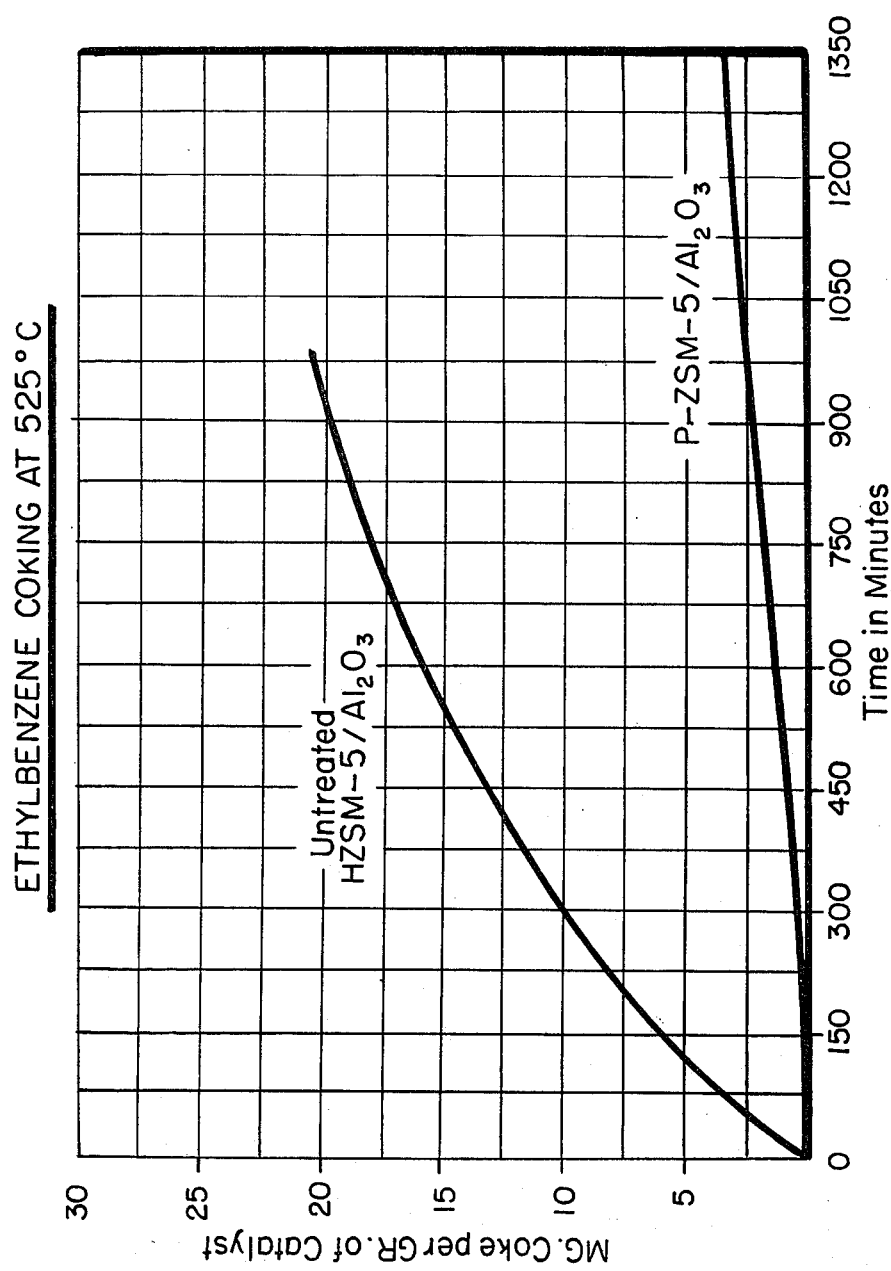
FIG. 2 is a graphical illustration of the decreased coking rate of a phosphorus treated catalyst with ethylbenzene at 525° C. (Example 5)

The coking rate experiment of Example 4 was repeated, except using ethylbenzene in place of the 1,2-dimethylbenzene and a temperature of 525° C. The results are shown in FIG. 2. As before, the coking rate of the phosphorus treated catalyst is seen to be significantly less than that of the untreated catalyst.

EXAMPLES 6-9

Figure 3:
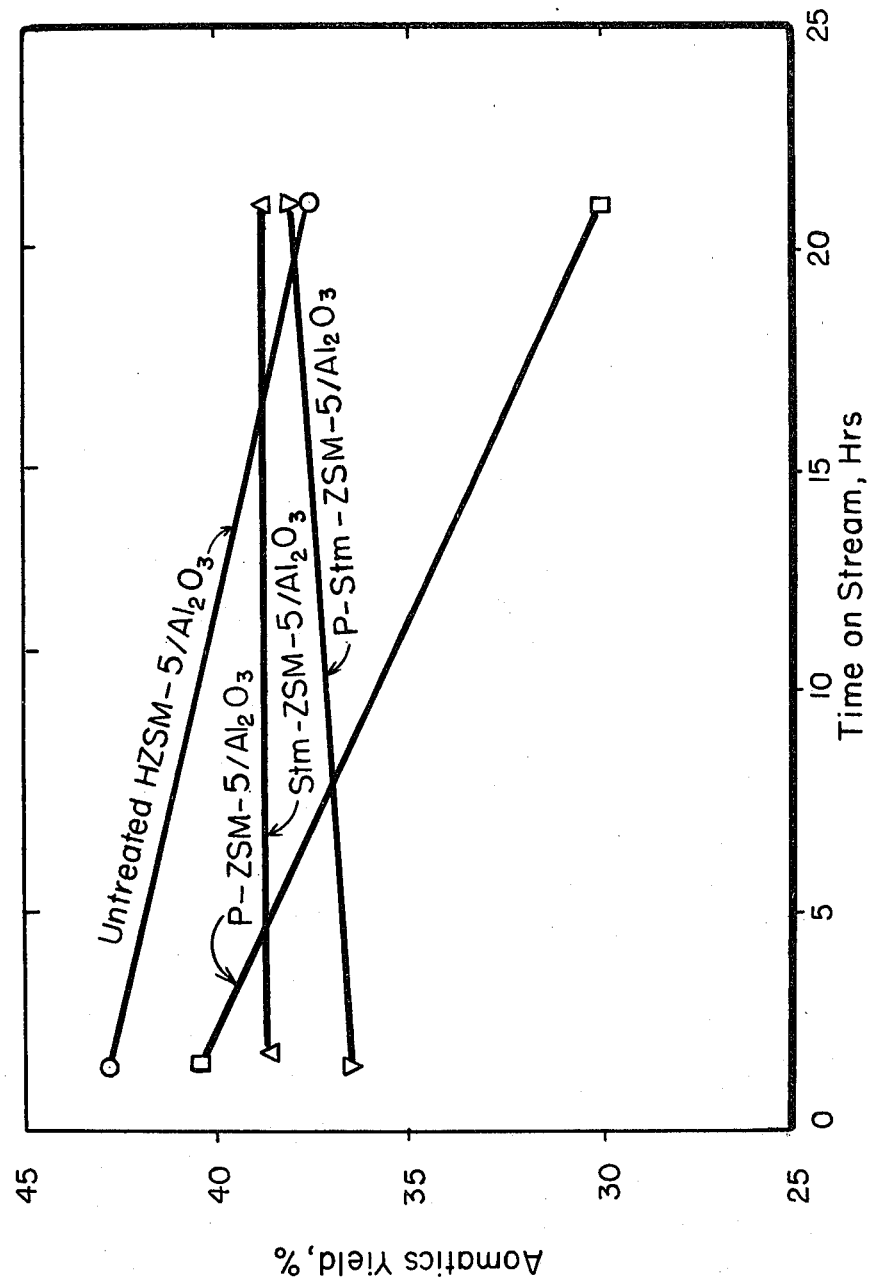
FIG. 3 is a graphical illustration of the aging characteristics of catalysts treated in the manner of this invention as compared to the same catalyst without pretreatment (Examples 6 through 9).

Aging and coking rates of both treated and untreated catalysts in an aromatization reaction were studied. 1-Heptene aromatization at 500° C. and atmospheric pressure was used as a test reaction for the catalyst comparison. The heptene was fed across 3.0 g of catalyst at a WHSV of 2.5. The effluent stream was analyzed after 1-2 hours and again after 20.5-21.5 hours of running time. The runs were terminated after 22 hours and the catalysts analyzed for final coke content. The results are given in Table I below and the aging rates illustrated graphically in FIG. 3 of the drawings.

TABLE I

| Example | Catalyst | % P | Aging Rate* | Final Coke, %** | α*** |
|---|---|---|---|---|---|
| 6 | HZSM-5/Al$_2$O$_3$ (untreated) | 0 | 12 | 25 | 222 |
| 7 | P-ZSM-5/Al$_2$O$_3$ | 3.2 | 26 | 15 | 266 |
| 8 | Stm-ZSM-5/Al$_2$O$_3$ | 0 | 0 | 13.5 | 109 |
| 9 | P.Stm-ZSM-5/Al$_2$O$_3$ | 4.3 | 0 | 6.5 | 54 |

Notes:
*% Aromatics yield loss during 22 hours on stream.
**After 22 hours on stream.
***A measure of the initial hexane cracking activity of the catalyst.

Comparing the phosphorus treated catalyst (Example 7) to the untreated catalyst (Example 6), it is seen that the mild phosphorus treatment reduced coking of the catalyst from 25% down to 15% for the 22 hour run. The aging rate however, increased somewhat. The mildly steamed catalyst (Example 8) had a significant reduction in both coke formation (13.5%) and aging rate. Phosphorus treatment in addition to steaming (Example 9) brought about even further reduction in coking (to 6.5%) with no indication of catalyst aging after 22 hours.

Having illustrated the significant and unexpected benefit to be derived from the disclosed invention by means of specific examples, it is to be understood that they are not intended to define limitations on the scope or utility thereof. Many modifications and variations may be made on the specific disclosure without departing from the spirit and scope of the invention, as will be readily apparent to those skilled in the art. Such modifications and variations are intended to be encompassed within the scope and purview of the appended claims.

I claim:

1. In the process of carrying out aromatization hydrocarbon conversion reactions over a catalyst comprising a crystalline zeolite characterized by a silica to alumina molar ratio of at least 12 and a Constraint Index of from about 1 to 12, the improvement which comprises:
   pretreating said catalyst to reduce the rate of catalyst aging and detrimental formation of coke thereon which occurs during said conversion reactions, by reacting said catalyst with a phosphorus-containing compound to deposit between 2% and 15% by weight of phosphorus on said catalyst and by subjecting said catalyst to an atmosphere comprising from 5% to 100% of steam at a temperature of from about 250° C. to about 1000° C. for a period of from about 15 minutes to about 100 hours.

2. A process as recited in claim 1 wherein said catalyst additionally comprises a binder therefor.

3. A process as recited in claim 2 wherein said binder is Al$_2$O$_3$.

4. A process according to claim 1 wherein said catalyst is contacted with steam before being reacted with phosphorus-containing compound in order to effect catalyst pretreatment.

5. A process as recited in claim 4 wherein said catalyst additionally comprises a binder therefor.

6. A process as recited in claim 5 wherein said binder is Al$_2$O$_3$.

7. A process according to claim 1, 2, 3, 4, 5 or 6 wherein said crystalline zeolite is selected from ZSM-5, ZSM-11, ZSM-23, ZSM-35 and ZSM-38.

8. A process according to claim 7 wherein said crystalline zeolite is ZSM-5.

* * * * *